United States Patent
Lirette

(10) Patent No.: US 9,160,103 B2
(45) Date of Patent: Oct. 13, 2015

(54) TERMINAL DEVICE FOR GROUNDING DIRECT CURRENT ELECTRICAL COMPONENT

(76) Inventor: Earl A. Lirette, Frisco, TX (US)

( * ) Notice: Subject to any disclaimer, the term of this patent is extended or adjusted under 35 U.S.C. 154(b) by 0 days.

(21) Appl. No.: 14/353,761

(22) PCT Filed: Nov. 2, 2011

(86) PCT No.: PCT/US2011/058955
§ 371 (c)(1),
(2), (4) Date: Apr. 23, 2014

(87) PCT Pub. No.: WO2013/066324
PCT Pub. Date: May 10, 2013

(65) Prior Publication Data
US 2014/0322954 A1    Oct. 30, 2014

(51) Int. Cl.
*H01R 4/10*     (2006.01)
*H01R 13/622*   (2006.01)
*H01R 4/30*     (2006.01)
*H01R 4/34*     (2006.01)
*H01R 4/64*     (2006.01)
*H01R 11/12*    (2006.01)
*H01R 4/56*     (2006.01)
*H01R 43/00*    (2006.01)
*H01R 4/18*     (2006.01)

(52) U.S. Cl.
CPC .............. *H01R 13/622* (2013.01); *H01R 4/302* (2013.01); *H01R 4/34* (2013.01); *H01R 4/56* (2013.01); *H01R 4/64* (2013.01); *H01R 11/12* (2013.01); *H01R 43/00* (2013.01); *H01R 4/185* (2013.01); *Y10T 29/49174* (2015.01)

(58) Field of Classification Search
CPC ................................ H01R 4/20; H01R 23/005
USPC ......... 439/879, 880, 884, 885, 888, 418, 404, 439/941
See application file for complete search history.

(56) References Cited

U.S. PATENT DOCUMENTS

| 5,316,506 | A  | * | 5/1994  | Ito ................................. | 439/879 |
| 5,675,891 | A  | * | 10/1997 | Childs et al. .................... | 29/879  |
| 7,607,957 | B1 | * | 10/2009 | Ho et al. ....................... | 439/879 |
| 9,016,160 | B2 | * | 4/2015  | Ichie et al. .................... | 74/493  |

* cited by examiner

*Primary Examiner* — Phuongchi T Nguyen
(74) *Attorney, Agent, or Firm* — Warner J. Delaune; Baker Donelson, et al.

(57) ABSTRACT

A terminal device used in grounding direct current electrical components, such as audio amplifiers, having a metal contact plate provided with a first opening sized to receive a securing screw and having a second opening sized to receive a locking screw used to attach the terminal device to a metal member of another structure, wherein the first opening is positioned relative to the second opening so that with the securing screw attaching the metal contact plate to a grounding surface, the head of the locking screw will contact and apply anti-rotational forces against the head of the securing screw when the locking screw is also screwed into the grounding surface.

15 Claims, 2 Drawing Sheets

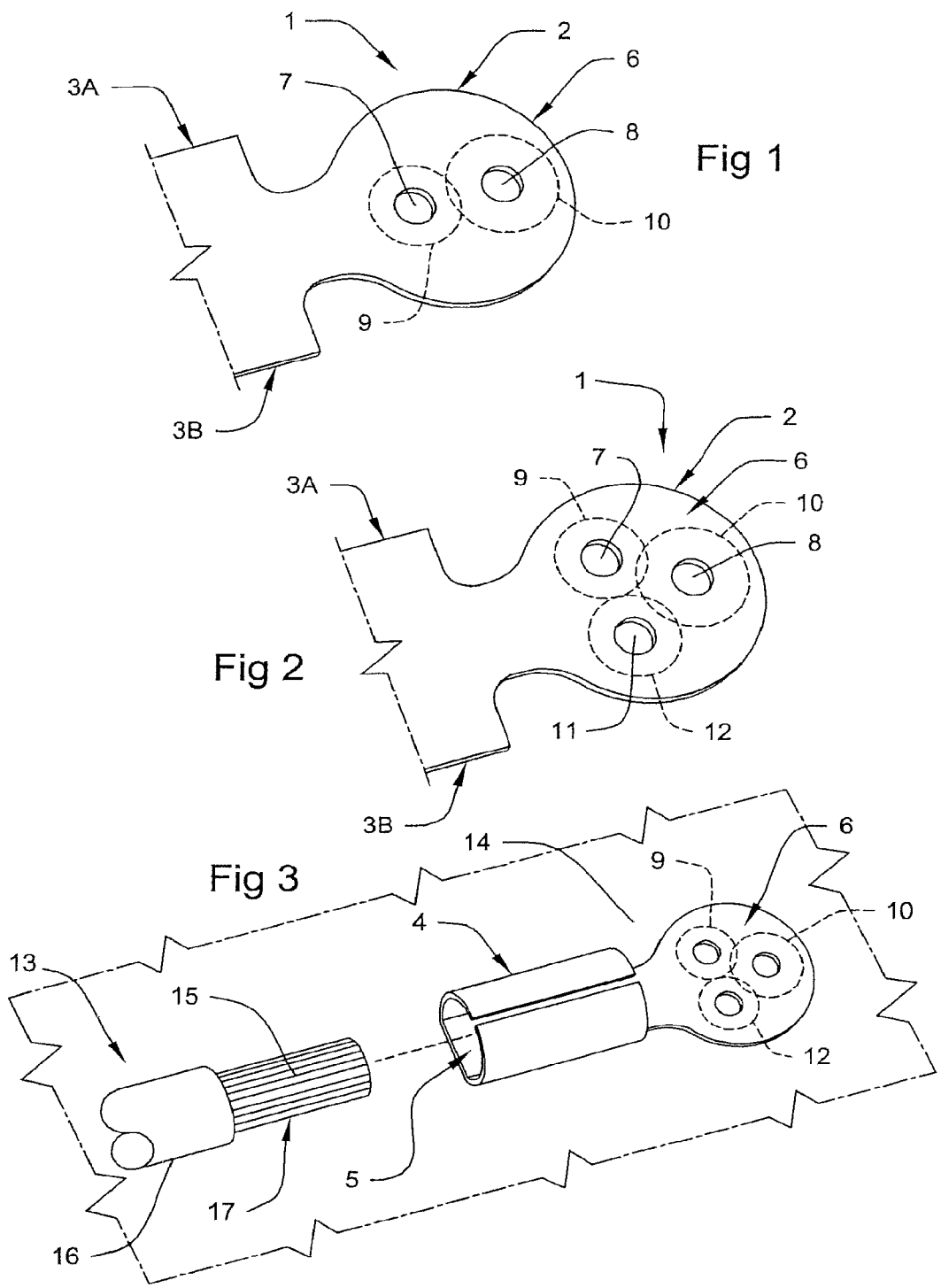

TERMINAL DEVICE FOR GROUNDING DIRECT CURRENT ELECTRICAL COMPONENT

BACKGROUND OF THE INVENTION

1. Field of the Invention

This invention relates in general to terminal devices used to electrically ground a direct current (DC) powered electrical or electronic component, and more particularly to terminal devices used to electrically ground audio amplifiers used in automobile or truck audio systems.

2. Prior Art

When installing a radio amplifier or similar electrical or electronic components, it is desirable to ground these components by electrically connecting them to some metal surface of another structure. In many cases this is achieved by attaching a ground wire operatively extending from the component to a near by metal surface.

In the case of installing a car radio having an amplifier it is common to affix the amplifier ground wire by use of a ground terminal to some part of the car metal structure, such as the relatively thin wall forming the car trunk. This is typically achieved by the use of a sheet metal screw to affix the ground terminal to the vehicle chassis, such as to trunk floor or wall. However, when the car engine is operating it creates vibrations in the vehicle chassis, including the trunk floor and wall that can cause the sheet metal screw to back out of the trunk floor or wall causing loss of the grounding connection between the ground terminal and the trunk floor or wall. Attempts have been made to design a terminal device to better prevent the terminal device from becoming unattached to the metal wall surface. Although some of these designs have reduced or eliminated some of these problems, there is still a need in the industry for a device that is not only less expensive to manufacture, but which can also be installed easily and quickly by a person having minimal training.

OBJECTS AND SUMMARY OF THE INVENTION

Therefore, one object of this invention is to provide a terminal device for use in connecting a ground wire from a DC electrical or electronic component used in a car, truck or similar vehicle that reduces or eliminates the detachment of the terminal device from a metal surface in the vehicle trunk compartment or other area due to engine vibration.

Another object of this invention is to provide a terminal device for use in connecting a ground wire from a DC electrical or electronic component used in a car, truck or similar vehicle that is inexpensive to manufacture.

Still another object of this invention is to provide a terminal device for use in connecting a ground wire from a DC electrical or electronic component used in a car, truck or similar vehicle that can be easily and quickly installed by a person of minimal training.

Other objects and advantages of this invention shall become apparent from the ensuing descriptions of the invention.

Accordingly, this invention in one embodiment comprises a terminal device having a grounding plate section provided with at least one locking screw opening and at least one securing screw opening, sized to receive a locking screw and a securing screw, respectively, and positioned relative to one another such that when the locking screw and the securing screw have been inserted through the locking screw opening and the securing screw opening to affix the grounding plate section to a metal surface of another structure, the locking screw will contact and exert a downward force against the securing screw.

In a preferred embodiment the terminal device is further provided with a ground wire receiving section having a passageway through which the ground wire can pass whereby the receiving section can then be crimped to fix the ground wire in the passageway at a position for easy attachment by one or more securing screws.

In another preferred embodiment the locking screw is constructed with a head section having a diameter greater than about twice the distance between the locking screw opening and the securing screw opening. In a more preferred embodiment the metal surface is sheet metal and the locking screw is a sheet metal screw.

In an alternate embodiment a process for utilizing the terminal device, such as described herein, to affix the ground wire from a DC electrical or electronic component to a metal surface includes the steps of removing the ground wire electrical insulation from an end section of the ground wire; extending the ground wire into the ground wire receiving section; crimping the ground wire receiving section sufficiently to secure the ground wire to the ground wire receiving section; securing the ground plate section by positioning the securing screw to the metal surface by screwing the securing screw positioned through the securing screw opening into the metal surface; and then positioning the locking screw through the locking screw opening and screwing the locking screw into the metal wall until the locking screw applies the desired anti-rotational force on the securing screw head. In this embodiment it is preferred the locking screw be constructed having a head section with sufficient diameter to permit the locking screw head section to contact and apply the desired anti-rotational force against the securing screw head section. It is more preferred that the locking screw head section be sized and shaped to maximize the surface area contact with the securing screw head section when the desired anti-rotational force is applied. It is preferred that the diameter of the locking screw head section be set whereby its perimeter edge contact the securing screw head section at a distance from the securing screw head section perimeter edge equal to at least one-quarter of the radius of the securing screw head section, and more preferably a distance from the securing screw head section perimeter edge equal to at least one-half of the radius of the securing screw head section.

The foregoing has outlined rather broadly the features and technical advantages of the present invention in order that the detailed description of the invention that follows may be understood. Additional features and advantages of the invention will be described hereinafter which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings illustrate preferred embodiments of this invention. However, it is to be understood that this embodiment is not intended to be exhaustive, nor limiting of the invention. It is but one example of the construction of this invention.

FIG. 1 is a top view of the metal plate utilized in the manufacture of one referred embodiment of the terminal device of this invention having a single securing screw opening and a single locking screw opening.

FIG. 2 is a top view of the metal plate utilized in the manufacture of another preferred embodiment of the terminal device of this invention having two securing screw openings and a single locking screw opening.

FIG. 3 is a three quarter perspective view of a terminal device that has been manufactured using the metal plate of FIG. 2 illustrating the overlapping of two of the securing screws by the single locking screw.

PREFERRED EMBODIMENTS OF THE INVENTION

Figure 4:
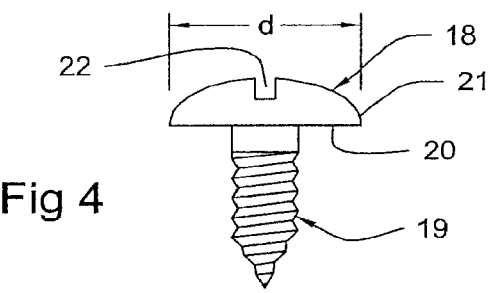
FIG. 4 is a front view of a sheet metal screw that may be utilized with the terminal device of this invention to affix the terminal device to a grounding metal wall surface.

Without any intent to limit the scope of this invention, reference is made to the figures in describing the preferred embodiments of the invention.

The ground terminal device 1 of this invention can be constructed from a generally flat metal plate having a rear section that can be bent to form a passageway to receive the ground wire and a forward section provided with two or more screw openings to accommodate at least one securing screw and at least one locking screw used to affix the terminal device to a grounding surface, such as a thin metal wall found in a car trunk compartment.

FIGS. 1 and 2 illustrate alternate embodiments of the ground terminal device 1.

In FIG. 1 metal plate 2 is constructed having generally rectangular-shaped rear wing sections 3A and 3B that can be bent by a conventional bending machine to form a tube shaped wall 4 having passageway 5. Metal plate 2 is also constructed having a generally flat tongue-shaped forward section 6 extending from the tube shaped wall 4. Forward section 6 is provided with a securing screw opening 7 and a locking screw opening 8. Openings 7 and 8 are sized to receive the tapered threaded shank of a securing screw 9 and a locking screw 10, respectively, but having a diameter less than the diameter of the head of screws 9 and 10, respectively. In FIG. 2 the ground terminal device 1 is similarly constructed, except that forward section 6 is provided with a second securing screw opening 11 sized to receive the tapered threaded shank of a second securing screw 12.

FIG. 3 illustrates the construction of the FIG. 2 embodiment of the terminal device 1 with the positioning of the ground wire 13 into passageway 5 and the securing of forward section 6 to flat metal grounding wall 14. Ground wire 13 is constructed having an inner metal core 15 that is coated with an insulation material 16. Typically core 15 is constructed of a single wire or intertwined multiple strands of wire. When utilized with the terminal device 1, the insulation material 16 about the extending end section 17 of core 15 is removed. The passageway 5 is sized to receive core end section 17. The length of core end section 17 that is to extend into passageway 5 must be sufficient to fix core end section 17 into passageway 5 when tube shaped wall 4 is crimped. In a preferred embodiment the length of core end section 17 and the length of passageway 5 will be approximately the same.

In a preferred embodiment, screws 9, 10 and/or 12 will be conventional sheet metal screws such as illustrated in FIG. 4. Each of the sheet metal screws 9, 10 and/or 12 is constructed having a head 18 and a tapered, threaded shaft 19 extending down from the bottom surface 20 of head 18. Although head 18 is typically constructed having arcuate-shaped cross-section with its top surface 21 being curved and having a diameter "d", it can be constructed in various other shapes, including a flat top surface 21. In surface 21 will be a slot 22 to receive a screwdriver blade or tip. The diameter of shaft 19 will be less than the diameter of screw head 18, and preferably about one-half of the diameter of screw head 18.

Figure 5:
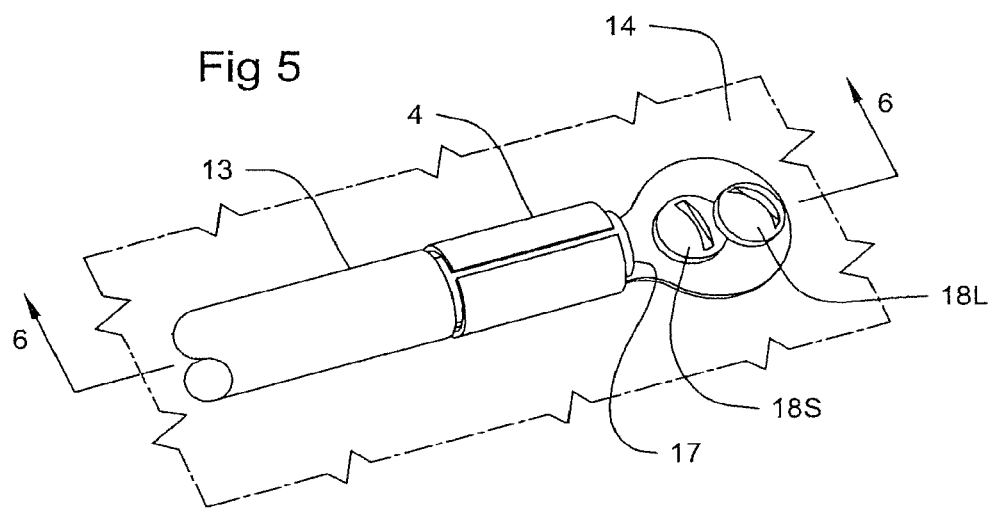
FIG. 5 is a perspective view of the FIG. 1 embodiment illustrating the overlapping of the locking screw on top of the securing screw in locking fashion to prevent the securing screw from backing out due to vibration or other causes.
Figure 6:
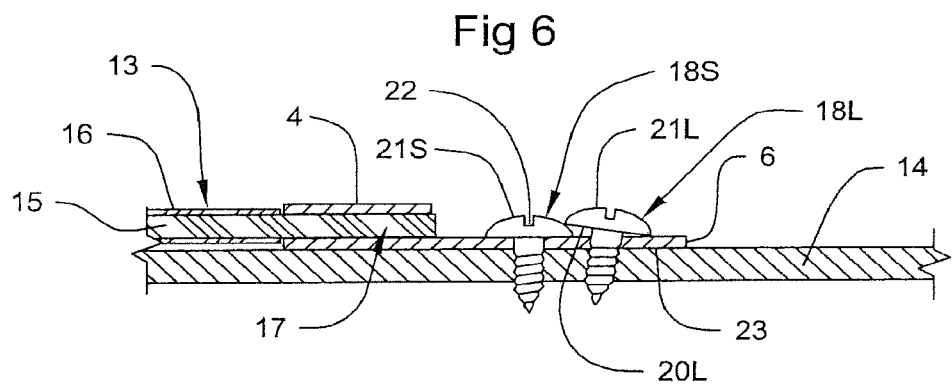
FIG. 6 is a cross-sectional view of FIG. 5 taken along lines 6-6.

FIGS. 5 and 6 illustrate the terminal device 1 of the FIG. 1 embodiment connected to core end section 17 and the grounding wall 14. In all embodiments of the terminal device 1, the distance between securing screw opening 7 and/or 11 and locking screw opening 8 should be set to ensure that when locking screw 10 is operatively screwed to grounding wall 14, its head 18L will contact and apply the desired pressure to the top surface 20 of the securing screw head 18S. When utilizing sheet metal screws, such as illustrated in FIG. 4, a preferred distance would be between about one-quarter and one-half the length of the diameter "d" of locking screw 10.

In this embodiment it is preferred the locking screw 10 be constructed having a head section 18L with sufficient diameter to permit the locking screw head section 18L to contact and apply the desired anti-rotational force against the securing screw head section 18S. It is more preferred that the locking screw head section 18L be sized and shaped to maximize the surface area contact with the securing screw head section 18S when the desired anti-rotational force is applied. In one embodiment the outer perimeter area of the bottom surface 20L of the locking screw head section 18L will be concave to mate with the convex outer surface of the securing screw head section 18S. In another embodiment it is preferred that the diameter "d" of the locking screw head section 18L be set whereby its perimeter edge contacts the securing screw head section 18S at a distance from the securing screw head section perimeter edge equal to at least one-quarter of the radius of the securing screw head section 18S, and more preferably a distance from the securing screw head section perimeter edge equal to at least one-half of the radius of the securing screw head section 18S. It is most preferred as indicated in FIG. 5 that locking screw head 18L overlap adjacent screw head slot 22 that will be approximately midpoint of the securing screw head top surface 21S.

When using the terminal device 1, the first step is to prepare ground wire 13 by removing insulation coating 16 from its extending core end section 17 to expose the interior metal wire 15. The amount of coating 16 to be removed should be sufficient to expose a length of wire 15 that when positioned in passageway 5 can be fixed in that position by crimping wall 4. Preferably, the length of the exposed wire 17 will be about the same length of passageway 5.

With ground wire 13 prepared, the bare wire end section 17 is inserted into passageway 5 and wall 4 is crimped to fix both physically and electrically end section 17 in passageway 5. The bottom surface 23 of terminal device forward section 6 is then brought into contact with grounding wall 14. Securing screw 9 is inserted through opening 7 and sufficiently screwed into grounding wall 14 whereby terminal device 1 is securely affixed to grounding wall 14. If more than one securing screw, such as second securing screw 12 in the FIG. 3 configuration, is to be used, then the second securing screw 12 is inserted into second securing screw opening 11 and also sufficiently screwed into grounding wall 14 to further secure terminal device 1 to wall 14. With securing screws operatively attached, then locking screw 10 is inserted through locking screw opening 8 and screwed into wall 14 until its screw head bottom surface 20L is sufficiently pressed against screw head top surface 21S to prevent vibrations from causing securing screw 9 to back out of wall 14.

It is preferred that both the securing screws and the locking screw be substantially identical to better prevent the installer from selecting an incorrect screw to be the locking screw 10. Still further to simplify installation it is also preferred that the spatial alignment of the securing screw opening 7 and the locking screw opening 8 be set whereby either opening can service the function of the other opening.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What I claim is:

1. A terminal device comprising a grounding wire receiving section to affix a ground wire to the grounding wire receiving section and a metal grounding plate section having a securing screw opening and a locking screw opening to receive a securing screw comprising a securing screw head section having a predetermined diameter and a locking screw comprising a locking screw head section having a predetermined diameter, respectively, the securing screw opening and the locking screw opening being positioned relative to one another such that when both the securing screw and the locking screw have been extended through the securing screw opening and the locking screw opening, respectively, the locking screw head section will contact and apply an anti-rotational force against the securing screw head section; wherein the securing screw and the locking screw are sheet metal screws having approximately the same size and shape.

2. A terminal device according to claim 1 wherein the ground wire receiving section forms a passageway into which the ground wire can extend and be affixed to the ground wire receiving section.

3. A terminal device according to claim 1, wherein the locking screw head section is sized and shaped to maximize the surface contact between the locking screw head section and the securing screw head section.

4. A terminal device according to claim 1, wherein the locking screw head section is constructed having a concave bottom surface, and the securing screw head section is constructed having a top convex shape shaped to mate with the concave bottom surface.

5. A terminal device according to claim 1, wherein the securing screw opening being positioned relative to the locking screw opening within a distance of between one-quarter and about one-half the diameter of the screw head.

6. A terminal device according to claim 1, wherein there are two securing screw openings with each of the two securing screw openings being positioned relative to the locking screw opening within a distance of between one-quarter and about one-half the diameter of the screw head.

7. A terminal device according to claim 1, wherein the locking screw head section having a perimeter edge, wherein the diameter of the locking screw head section be set whereby its perimeter edge contacts the securing screw head section at a distance from the securing screw head section perimeter edge equal to at least one-quarter of the radius of the securing screw head section.

8. A terminal device according to claim 7, wherein the distance from the securing screw head section is equal to at least one-half of the radius of the locking screw head section.

9. A process for utilizing a terminal device to affix a ground wire extending from a DC powered electrical or electronic component to a metal wall surface located in another structure, wherein the terminal device comprises a ground wire receiving section to affix a ground wire to the grounding wire receiving section and a metal grounding plate section having a securing screw opening and a locking screw opening to receive a securing screw and a locking screw, respectively, the securing screw opening and the locking screw opening being positioned relative to one another such that when both the locking screw and the securing screw have been extended through the locking screw opening and the securing screw opening, respectively, the locking screw having a screw head of known diameter will contact and apply an anti-rotational force against the securing screw, comprising the steps of:

a. affixing the ground wire to the ground wire receiving section;
   b. positioning the metal grounding plate section adjacent the metal wall surface;
   c. inserting the securing screw through the securing screw opening and screwing the securing screw into the metal wall surface a sufficient distance to affix the metal grounding plate section to the metal wall surface; and
   d. inserting the locking screw through the locking screw opening and screwing the locking screw into the metal wall surface a sufficient distance whereby the screw head of the locking screw contacts the securing screw with a downward anti-rotational force;

wherein the locking screw and the securing screw are sheet metal screws having approximately the same size and shape.

10. The process according to claim 9, wherein the locking screw head section is sized and shaped to maximize the surface contact between the locking screw head section and the securing screw head section.

11. The process according to claim 9, wherein the locking screw head section having a perimeter edge, wherein the diameter of the locking screw head section be set whereby its perimeter edge contacts the securing screw head section at a distance from the securing screw head section perimeter edge equal to at least one-quarter of the radius of the securing screw head section.

12. The process according to claim 11, wherein the distance from the securing screw head section is equal to at least one-half of the radius of the securing screw head section.

13. The process according to claim 9, wherein the securing screw openings being positioned a distance of between one-quarter and about one-half the diameter of the screw head from the locking screw opening.

14. The process according to claim 13, wherein there are two or more securing screws, inserting both securing screws into separate securing screw openings in the metal grounding plate section and screwing both securing screws into the metal wall a sufficient distance to affix the metal grounding plate section to the metal wall, and screwing the locking screw into the metal wall a sufficient distance whereby the screw head of the locking screw contacts and applies an anti-rotational force against each of the securing screws to prevent the securing screws from reverse rotating out of the metal wall.

15. The process according to claim 14, wherein each of the two securing screw openings being positioned relative to the locking screw opening within a distance of between one-quarter and about one-half the diameter of the screw head.

* * * * *